Patented May 30, 1939

2,160,555

UNITED STATES PATENT OFFICE 2,160,555

PARTIALLY ESTERIFIED COMPOUNDS OF THE DIHYDRO-ESTRIN SERIES AND PROCESS OF MAKING SAME

Karl Miescher, Riehen, and Caesar Scholz, Basel, Switzerland, assignors to the firm of Society of Chemical Industry in Basle, Basel, Switzerland No Drawing. Application July 19, 1938, Serial No. 220,122. In Switzerland November 20, 1936

15 Claims. (Cl. 260—397)

The present application is a continuation in part of our copending application Serial No. 167,866 filed October 7, 1937.

This invention is based on the surprising observation that partially esterified compounds of the dihydro-estrin series having a free phenolic hydroxyl are obtained when completely esterified compounds of the dihydro-estrin series are treated in careful manner with hydrolytically acting agents. In this way only those acid residues are split off which are bound at the phenolic hydroxyl-groups.

As hydrolytically acting agents there may be used both those of an alkaline nature and those of an acid nature. Suitable alkaline agents are, for example alkali hydroxides, alkali carbonates, alkaline earth hydroxides, magnesia or the like. As acid reagents hydrogen halide acids, sulfuric acid, phosphoric acid or the like may be used.

It is preferable to use a suitable solvent, especially an alcohol, for instance methyl alcohol, ethyl alcohol, isopropyl alcohol, but also acetone, dioxane and the like may be used in the presence of water if desired.

By compounds of the dihydroestrin series are meant estradiol, dihydroequilenin and estriol.

Thus, there may be obtained when starting from estradiol di-esters, for example, homogeneous estradiol-17-mono-esters. In like manner from estriol tri-esters there are obtained estriol-16:17-di-esters. While the partial saponification of di-esters of the androstane diols leads to mixtures, the constituents of which can be separated only with difficulty, the reaction on which this invention depends is surprisingly unitary and the partially esterified compounds of the dihydro-estrin series with a free phenolic hydroxyl are obtained in practically quantitative yields. This happens even when the hydroxyl groups of the parent material are all substituted by the same acyl residue. With like result, however, mixed esterified compounds of dihydro-estrin series may be partially split.

The compounds obtainable by this invention are intended for use in therapy.

The following examples illustrate the invention, the parts being by weight:

Example 1

1 part of estradiol-3,17-dipropionate (melting point 104 to 105° C.; made, for example, by action of propionic anhydride on estradiol in pyridine solution) is mixed with 50 parts of a solution of 1 per cent. strength of potassium carbonate in methyl alcohol of 90 per cent. strength and the mixture is stirred for some time at room temperature. The estradiol-3,17-dipropionate gradually passes into solution. This solution is acidified and a precipitate is produced by the addition of 200 parts of water. This is filtered and washed successively with water, dilute sodium carbonate solution and again with water. The estradiol-17-mono-propionate which is already very pure can be recrystallized from a mixture of methyl alcohol and water. It melts at 199 to 200° C.

The time necessary for the reaction depends on the temperature and the degree of dilution used.

Example 2

A solution of 1 part of estradiol-3,17-dipropionate in 350 parts of methyl alcohol is mixed with 0.15 part of potassium hydroxide and the mixture is allowed to stand at room temperature for some time. After acidification and concentration in a vacuum this solution is diluted with 300 parts of water. The crystalline precipitate thus produced is now further worked up as described in Example 1, the product again being the estradiol-17-monopropionate of melting point 199 to 200° C.

Example 3

1 part of estradiol-3,17-di-n-butyrate (melting point 64 to 65° C.; obtainable for example by the action of n-butyric anhydride on a pyridine solution of estradiol) is mixed with 50 parts of a solution of 0.5 per cent. strength of sodium carbonate in methyl alcohol of 95 per cent. strength and the whole is stirred at room temperature for some time. After acidification, precipitation with water and the usual working-up the estradiol-17-mono-n-butyrate is obtained in slender crystalline needles and may be recrystallized from a mixture of alcohol and water and melts at 166 to 167° C.

In a similar manner there is obtained, for instance, the estradiol-17-mono-iso-butyrate of melting point 183 to 183.5° C.

Example 4

1 part of estradiol-3,17-n-divalerianate (boiling point 0.01 mm=220 to 230° C. bath temperature; made for example, by the action of n-valeric anhydride on a solution of estradiol in pyridine) is mixed with 50 parts of a solution of 0.5 per cent. strength of potassium carbonate in methyl alcohol of 95 per cent. strength, and the whole is stirred for some time at 20° C. The oily n-divalerianate passes gradually into solution.

The solution is neutralized and the precipitate is produced by the addition of about 200 parts of water. This finely crystalline product is filtered and washed successively with water, dilute sodium carbonate solution and again with water. It may be further purified by crystallization from a mixture of methyl alcohol and water. The estradiol-17-mono-n-valerianate melts at 144 to 145° C.

In a similar manner there are obtained, for instance, the estradiol-17-iso-valerianate, the estradiol-17-mono-capronates, such as the estradiol-17-mono-n-capronate of melting point 128.5 to 129° C., the estradiol-17-mono-oenanthates and the estradiol-17-mono-caprylates such as the estradiol-17-mono-n-caprylate of melting point 117.5 to 118° C.

*Example 5*

1 part of estradiol-3,17-dicaprate (oil; boiling point 0.001 mm=260 to 265° C. bath temperature; made for example by the action of caprinyl-chloride on estradiol in the presence of pyridine) and 60 parts of a solution of 0.5 per cent. strength of potassium carbonate in methyl alcohol of 95 per cent. strength are stirred together for some time at room temperature. The mixture is neutralized with hydrochloric acid, water is added to produce a precipitate and the latter is worked-up in the usual manner. The estradiol-17-mono-caprate is thus obtained in fine crystalline laminae which may be recrystallized from a mixture of methyl alcohol and water and then melt at 112 to 112.5° C.

Instead of potassium carbonate, barium hydroxide, magnesia or the like may be used.

*Example 6*

1 part of estradiol-3,17-dipropionate (melting point 104 to 105° C.; obtainable, for example, by the action of propionic anhydride on estradiol in pyridine solution) is mixed with 100 parts of a 0.5 N-solution of hydrochloric acid in absolute alcohol. The mixture is stirred for some time at room temperature. The estradiol-3,17-dipropionate passes slowly into solution. The mixture is then neutralized with sodium carbonate solution and the product of reaction is precipitated in the form of crystalline needles by gradual addition of 300 parts of water. The crystalline mass is washed successively with water, a little dilute sodium carbonate solution and water. For further purification recrystallization from a mixture of methanol and water may be used. The estradiol-17-mono-propionate melts at 199 to 200° C.

*Example 7*

1 part of estradiol-3,17-di-n-butyrate (melting point 64 to 65° C.; obtainable, for example, by the action of n-butyric anhydride on a pyridine solution of estradiol) is mixed with 75 parts of a solution of 2 per cent. strength of hydrochloric acid in absolute alcohol and the whole is stirred for some time at 20° C., whereby the substance is gradually dissolved. After neutralization water is added to produce a precipitate and the treatment of the latter follows that described in Example 1. The fine crystalline needles thus obtained are estradiol-17-mono-n-butyrate. They may be recrystallized from aqueous alcohol and then melt at 166 to 167° C.

Instead of hydrochloric acid there may also be used other hydrolytically acting agents, such as for instance hydrobromic acid, sulfuric acid, phosphoric acid and the like.

In quite analogous manner other 17-monoesters, for example caproate, stearate, palmitate and corresponding carbonic acid esters of the type of estradiol, for example the estradiol-17-mono-ethyl carbonate of melting point 171 to 172° C. or the 16,17-diester of the type of estriol may be obtained. It may be an advantage to start from mixed esters of which the phenolic hydroxyl has been substituted by especially easily eliminated acid residues, for example the acetyl or the formyl residue. This is particularly so in making compounds of the dihydro-estrin series which are substituted in 17-position by aromatic residues, for instance the estradiol-17-mono-benzoate which has been pepared for example from estradiol-3-butyrate-17-benzoate or the like.

*Example 8*

A solution of 1 part of estradiol-3,17-propionate in 160 parts of ethyl alcohol is shaken in the presence of reduced platinum oxide which always contains alkali either adsorbed or chemically combined. After filtration and evaporation of the alcohol in a vacuum there remains an oil which rapidly crystallizes and may be recrystallized from aqueous methanol. The estradiol-17-monopropionate is thus obtained in the form of lustrous crystalline laminae of melting point 199 to 200° C.

In a quite analogous manner there are obtained partial esterified dihydro-equilenine and estriol with a free phenolic hydroxyl group when treating completely esterified dihydroequilenine or estriol with hydrolytically acting agents of an alkaline or an acid nature.

What we claim is:

1. A process for the manufacture of partially esterified compounds of the dihydroestrin series consisting of estradiol, dihydro-equilenin and estriol having a free phenolic hydroxyl group, comprising treating a completely esterified compound of the said dihydroestrin series with a hydrolytically acting agent until the acyl radical attached to the phenolic hydroxyl group is eliminated.

2. A process for the manufacture of 17-monoesters of estradiol, comprising treating an estradiol-diester with a hydrolytically acting agent until the acyl radical attached to the phenolic hydroxyl group is eliminated.

3. A process for the manufacture of 17-monoesters of estradiol, comprising treating an estradiol-diester with a hydrolytically acting agent of alkaline nature until the acyl radical attached to the phenolic hydroxyl group is eliminated.

4. A process for the manufacture of aliphatic 17-monoesters of estradiol, comprising treating an aliphatic estradiol-diester with a hydrolytically acting agent of alkaline nature until the acyl radical attached to the phenolic hydroxyl group is eliminated.

5. A process for the manufacture of estradiol-17-monocaprate, comprising treating estradiol-3,17-dicaprate with a hydrolytically acting agent of alkaline nature until the acyl radical attached to the phenolic hydroxyl group is eliminated.

6. A process for the manufacture of estradiol-17-monocapronates, comprising treating estradiol-3,17-dicapronates with a hydrolytically acting agent of alkaline nature until the acyl radical attached to the phenolic hydroxyl group is eliminated.

7. A process for the manufacture of estradiol- 17-mono-n-capronate, comprising treating estradiol-3,17-di-n-capronate with a hydrolytically acting agent of alkaline nature until the acyl radical attached to the phenolic hydroxyl group is eliminated.

8. A process for the manufacture of estradiol-17-monocaprylates, comprising treating estradiol-3,17-dicaprylates with a hydrolytically acting agent of alkaline nature until the acyl radical attached to the phenolic hydroxyl group is eliminated.

9. A process for the manufacture of estradiol-17-mono-n-caprylate, comprising treating estradiol-3,17-di-n-caprylate with a hydrolytically acting agent of alkaline nature until the acyl radical attached to the phenolic hydroxyl group is eliminated.

10. The estradiol-17-monoesters, the acid radical of which contains more than two carbon atoms.

11. The estradiol-17-monocaprate of melting point 112 to 112.5° C.

12. The estradiol-17-monocapronates.

13. The estradiol - 17 - mono-n-capronate of melting point 128.5 to 129° C.

14. The estradiol-17-mono-caprylates.

15. The estradiol - 17 - mono-n-caprylate of melting point 117.5 to 118° C.

KARL MIESCHER.
CAESAR SCHOLZ.